United States Patent
Jacob Mathecken et al.

(10) Patent No.: US 12,108,342 B2
(45) Date of Patent: Oct. 1, 2024

(54) TECHNIQUE FOR SKIP SIGNAL TRANSMISSION

(71) Applicant: Telefonaktiebolaget LM Ericsson (publ), Stockholm (SE)

(72) Inventors: Pramod Jacob Mathecken, Lomma (SE); Sina Maleki, Malmö (SE); Ilmiawan Shubhi, Malmö (SE); Niklas Andgart, Södra Sandby (SE); Kristofer Sandlund, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 310 days.

(21) Appl. No.: 17/634,003

(22) PCT Filed: Aug. 14, 2020

(86) PCT No.: PCT/SE2020/050786
§ 371 (c)(1),
(2) Date: Feb. 9, 2022

(87) PCT Pub. No.: WO2021/034253
PCT Pub. Date: Feb. 25, 2021

(65) Prior Publication Data
US 2022/0322227 A1 Oct. 6, 2022

Related U.S. Application Data

(60) Provisional application No. 62/888,261, filed on Aug. 16, 2019.

(51) Int. Cl.
*H04W 52/02* (2009.01)
(52) U.S. Cl.
CPC ..... *H04W 52/028* (2013.01); *H04W 52/0229* (2013.01); *H04W 52/0235* (2013.01)

(58) Field of Classification Search
CPC .......... H04W 52/028; H04W 52/0229; H04W 52/0235
(Continued)

(56) References Cited

U.S. PATENT DOCUMENTS

2012/0213137 A1 8/2012 Jeong et al.
2015/0296455 A1 10/2015 Yamazaki et al.
(Continued)

FOREIGN PATENT DOCUMENTS

WO 2015077933 A1 6/2015

OTHER PUBLICATIONS

R2-1906859 (Year: 2019).*
(Continued)

*Primary Examiner* — Intekhaab A Siddiquee
(74) *Attorney, Agent, or Firm* — Coats & Bennett, PLLC

(57) ABSTRACT

A technique of selectively transmitting a skip signal indicative of skipping a downlink control channel from an access node (100; 600; 712; 820) to a radio device (791; 792; 830) is provided. As to a method aspect, a method (200) of selectively transmitting a skip signal indicative of skipping a downlink control channel comprises or initiates determining (202), for the radio device (791; 792; 830), whether a criterion for at least one of skipping the downlink control channel and transmitting the skip signal indicative of skipping the downlink control channel is fulfilled. The method (200) further comprises or initiates transmitting (204), to the radio device (791; 792; 830), the skip signal indicative of skipping the downlink control channel if the criterion has been determined (202) to be fulfilled for a predefined duration.

20 Claims, 9 Drawing Sheets

200

Determine, for a radio device, whether a criterion for skipping a downlink control channel and/or for transmitting a skip signal indicative of skipping the downlink control channel is fulfilled — 202

Transmit, to the radio device, the skip signal indicative of skipping the downlink control channel if the criterion has been determined to be fulfilled for a predefined duration — 204

(58) Field of Classification Search
USPC .......................................................... 370/311
See application file for complete search history.

(56) References Cited

U.S. PATENT DOCUMENTS

2018/0098258 A1    4/2018  Annam et al.
2022/0322227 A1*  10/2022  Jacob Mathecken ........................
                                                        H04W 24/10

OTHER PUBLICATIONS

Qualcomm Incorporated, "UE Adaptation to the Traffic and UE Power Consumption Characteristics", 3GPP TSG-RAN WG1 Meeting #95, Spokane, USA, Nov. 12, 2018, pp. 1-20, R1-1813447, 3GPP.
CATT, "Report on [105bis# 27][NR/Power Saving]—PDCCH skipping", 3GPP TSG-RAN WG2 Meeting #106, Reno, USA, May 13, 2019, pp. 1-26, R2-1908072, 3GPP.
CATT, "PDCCH skipping and switching of PDCCH monitoring periodcity", 3GPP TSG RAN WG1 Meeting #97, Reno, USA, May 13, 2019, pp. 1-6, R1-1906353, 3GPP.
3rd Generation Partnership Project, "3rd Generation Partnership Project; Technical Specification Group Radio Access Network; NR; Study on User Equipment (UE) power saving in NR (Release 16)", Technical Report, 3GPP TR 38.840 V16.0.0, Jun. 1, 2019, pp. 1-74, 3GPP.
3rd Generation Partnership Project, "3rd Generation Partnership Project; Technical Specification Group Services and System Aspects; Release 15 Description; Summary of Rel-15 Work Items (Release 15)", Technical Specification, 3GPP TR 21.915 V15.0.0, Sep. 1, 2019, pp. 1-118, 3GPP.

\* cited by examiner

TECHNIQUE FOR SKIP SIGNAL TRANSMISSION

TECHNICAL FIELD

The present disclosure relates to skipping a downlink control channel. More specifically, and without limitation, a method and a device for selectively transmitting a skip signal indicative of skipping a downlink control channel are provided.

BACKGROUND

In June 2018, the working group for the physical radio layer, RAN1, at the Third Generation Partnership Project (3GPP) had started a study item titled "Study On User-Equipment (UE) Power Savings for NR" for 3GPP Release 16, which also relates to the fifth generation (5G) radio access technology briefly referred to as New Radio (NR). The study item is defined in the 3GPP document TR 38.840 ("Study on User Equipment (UE) Power Saving in NR") and the 3GPP document TR 21.915 ("Summary of Release-15 Work Items"). The study item is currently a work item in 3GPP (with work item code of 830075). The objective of the work item is to assess and address the (potentially high) energy consumption of radio devices (e.g., user equipments or UEs) that operate on NR technology. Specifically, from a physical layer perspective, the goal is to analyze the various layer-1 (L1, i.e., physical layer or PHY) features that can result in high energy consumption for a UE and to propose solutions for lowering the energy consumption.

At least some UE power saving features should be applicable when the radio device is in a connected mode (also referred to as connected state) with an access node (e.g., a base station) serving the radio device. For the connected mode, at last some of the UE power saving features can be broadly classified into power savings features during an active time and power saving features during Discontinuous Reception (DRX).

UE power saving features during the active time comprise a skip signal for the physical downlink control channel (PDCCH), PDCCH-skip signal, for reducing PDCCH monitoring performed by the radio device. Responsive to the PDCCH-skip signal, the radio device goes to sleep for a specified skipping period (also: skip time). Upon completion of the skipping period, the radio device resumes monitoring of the PDCCH.

Conventionally, the access node may transmit a skip signal whenever a downlink buffer is empty or nothing is scheduled. A major drawback with the conventional skip signal is the large number of skip signals being transmitted when the criterion for transmitting the PDCCH-skip signal is satisfied most of the time, thereby, resulting in a high number of skip signal transmissions, which imposes a large overhead onto the radio access network (RAN or briefly: network).

This may also result in the radio device being kept in a sleep-state for most of its active time, which can result in high latency and, thus, lower throughput. The latency problem occurs particularly if the skipping period is set inappropriately long. The latency problem can also happen for short lengths of the skipping period. The reasoning may be as follows. The criterion for transmitting the skip signal can be satisfied in every monitoring slot of the RAN's time-domain structure. For example, the criterion may be fulfilled if a buffer for the radio device is empty at the access node. Then, the access node (i.e., the network) would conventionally transmit the PDCCH-skip signals on every slot. Consequently, whenever the radio device (e.g., a UE) wakes-up, the radio device is immediately put back to sleep, because of the continuous transmission of the skip signals.

SUMMARY

Accordingly, there is a need for a technique that enables power saving with less signaling overhead and/or less latency at least in some situations.

As to a method aspect, a method of selectively transmitting a skip signal indicative of skipping a downlink control channel from an access node to a radio device is provided. The method comprises or initiates determining, for the radio device, whether a criterion for at least one of skipping the downlink control channel and transmitting the skip signal indicative of skipping the downlink control channel is fulfilled. The method further comprises or initiates transmitting, to the radio device, the skip signal indicative of skipping the downlink control channel if the criterion has been determined to be fulfilled for a predefined duration.

The criterion may be a conventional criterion for transmitting the skipping signal, e.g., a criterion that is conventionally sufficient for the transmission of the skip signal. Alternatively or in addition, the criterion may be a criterion for skipping the downlink control channel.

For example, the criterion may have been determined to be fulfilled for a predefined duration (or a skip signal is transmitted), if the criterion has been positively determined at least twice within said predefined duration. The criterion may have been determined to be not fulfilled for the predefined duration (or a skip signal is not transmitted), if the duration has not yet expired since the criterion was initially determined to be fulfilled, if the criterion was determined to be not fulfilled at least once within the predefined duration and/or if the criterion is currently determined to be not fulfilled. A time interval, in which the criterion has been determined to be fulfilled, may have a length according to the predefined duration and may have an end point at the latest determination and/or at the time of transmitting the skip signal.

Herein, "the criterion is determined to be fulfilled" may be based on or relate to a current determination. Alternatively or in addition, "the criterion has been determined to be fulfilled for a predefined duration" may be based on or relate to a current determination and at least one past determination prior to the current determination.

In at least some embodiments, by transmitting the skip signal not immediately in response to determining that the criterion is currently or initially fulfilled, unnecessary or detrimental transmissions of the skip signal can be avoided. For example, a brief gap in a downlink stream of data packets through the access node to the radio device, which would conventionally trigger the skip signal, can be avoided for an energy efficient and undelayed transmission of the data packets after the gap.

Same or further embodiments of the technique may reduce a rate of skip signal transmissions without implementing multiple or complex criteria for determining when to transmit the skip signal. The technique may be implemented for a robust and/or efficient skip signal transmission independent of the details of the underlying criterion. Even if the criterion keeps getting satisfied too often, the rate of skip signal transmission may be limited. For example, the rate of skip signal transmissions may be limited to the inverse of the predefined duration.

The technique may be transparent for the radio device, e.g., in the sense that no modification at the radio device is necessary.

The step of determining may be repeated and/or performed periodically.

The step of determining may be performed multiple times prior to transmitting the skip signal to the radio device.

The skip signal may be transmitted if, or only if, the criterion has been determined to be fulfilled at least twice within the predefined duration.

The skip signal may be transmitted if (e.g., only if) the criterion has been determined to be fulfilled at at least two different points in time. The at least two different points in time may span or exceed the predefined duration. The at least two different points in time may comprise the latest determination and/or the current determination.

The method may further comprise or initiate the step of: if the criterion is determined to be fulfilled and a determination timer for the radio device is not running, starting or restarting the determination timer. The determination timer may be set to expire after the predefined duration.

The determination timer may be implemented and/or represented by a starting time and/or a running status, e.g., at the access node. Alternatively or in addition, the determination timer may be dedicated for the radio device. In other words, the determination timer may be specific for the radio device. The determination timer may be started by setting the running status (e.g., to a value equal to "true" or "1") and/or setting the starting time (e.g., to a value equal to the current time).

The method may further comprise or initiate the step of: if the criterion is determined to be not fulfilled, stopping the determination timer for the radio device.

The method may further comprise or initiate the step of: if the criterion is determined to be fulfilled and a skip state is released for the radio device, setting the skip state for the radio device.

The skip state may be implemented and/or represented by a state variable (which may be referred to as a skip state variable), e.g., at the access node. Alternatively or in addition, the skip state may be dedicated for the radio device. In other words, the skip state may be specific for the radio device. The skip state may be referred to as set if (e.g., only if) the skip state is valid or true for the radio device. The skip state may be referred to as released if (e.g., only if) the skip state is not valid, not true or false for the radio device. For example, the skip state may be set if (e.g., only if) the skip state variable is equal to "true" or "1". Setting the skip state may be implemented by setting or assigning the skip state variable to "true" or "1". The skip state may be released if (e.g., only if) the skip state variable is equal to "false" or "0". Releasing the skip state may be implemented by setting or assigning the skip state variable to "false" or "0".

The determination timer may be started or restarted to expire after the predefined duration, if (e.g., only if) the criterion is determined to be fulfilled and the skip state is released for the radio device.

The method may further comprise or initiate the step of: if the criterion is determined to be not fulfilled, releasing the skip state for the radio device.

The skip signal may be transmitted if (or only if) the criterion is determined to be fulfilled and the skip state is set and the determination timer is not running.

The determination timer may be not running as a result of stopping the determination timer, expiry of the determination timer and/or if the determination timer has not been started.

The determination timer may be started or restarted to expire after the predefined duration, if (or only if) the criterion is determined to be fulfilled and the skip state is set and the determination timer is not running.

The method or at least one of the step of determining and the step of transmitting may be performed by the access node.

The skip signal may be transmitted in downlink control information (DCI) on the downlink control channel.

The skip signal may trigger the radio device to refrain from monitoring the downlink control channel responsive to the skip signal during a skipping period.

The method may further comprise or initiate the step of: transmitting a radio resource control (RRC) signal that is indicative of the skipping period during which the radio device refrains from monitoring the downlink control channel responsive to the skip signal.

The DCI or the skip signal may be further indicative of the skipping period during which the radio device refrains from monitoring the downlink control channel responsive to the skip signal.

The access node may be wirelessly serving the radio device. Alternatively or in addition, the radio device may be in a connected mode with the access node, preferably during an active time of the connected mode.

The downlink control channel may be a physical downlink control channel (PDCCH). Alternatively or in addition, skip signal may be a PDCCH-skip signal.

The radio device may be configured with a monitoring periodicity for monitoring the downlink control channel. The skip signal may be transmitted on the downlink control channel when the radio device monitors the downlink control channel according to the monitoring periodicity.

The skip signal may trigger the radio device to refrain from monitoring the downlink control channel according to the monitoring periodicity responsive to the skip signal.

The criterion may comprise a status of a buffer at the access node for the radio device, preferably the buffer being empty. Alternatively or in addition, the criterion may comprise a status of a scheduling for the radio device, preferably an absence of scheduling.

The buffer may be an uplink (UL) buffer and/or a downlink (DL) buffer. The buffer may be at an application (AP) layer, a radio link (e.g. radio link control, RLC) layer, a medium access control (MAC) layer or the physical (PHY) layer. The buffer may be a transmission control protocol (TCP) buffer, a packet data unit (PDU) buffer and/or a hybrid automatic repeat request (HARQ) buffer.

The criterion may comprise at least one criterion, e.g. condition. For example, the criterion may comprise two or more conditions. The conditions (which may also be referred to as sub-conditions, sub-criteria, or briefly: criteria) may be combined by a logical conjunction ("AND") in the criterion.

As to a device aspect, a device for selectively transmitting a skip signal indicative of skipping a downlink control channel from an access node to a radio device is provided. The device comprises a determining unit or a determination module configured to determine, for the radio device, whether a criterion for at least one of skipping the downlink control channel and transmitting the skip signal indicative of skipping the downlink control channel is fulfilled. The device further comprises a transmitting unit or a transmission module configured to transmit, to the radio device, the skip signal indicative of skipping the downlink control channel if the criterion has been determined to be fulfilled for a predefined duration.

As to a further device aspect, a device for selectively transmitting a skip signal indicative of skipping a downlink control channel from an access node to a radio device is provided. The device comprises at least one processor and a memory. Said memory comprises instructions executable by said at least one processor whereby the device is operative to perform any one of the steps of the method aspect.

As to a still further device aspect, a device for selectively transmitting a skip signal indicative of skipping a downlink control channel from an access node to a radio device is provided. The device is configured to perform or initiate any one of the steps of the method aspect.

The method aspect may be performed at or by the access node (e.g., a base station). The device aspect may be embodied by the access node (e.g., a base station).

The above aspects or further aspects may be defined according to the below embodiments. The method aspect and/or the device aspect may further comprise any feature or step disclosed in any one of the embodiments. Alternatively or in addition, a further method aspect and/or a further device aspect may be defined by any one of the embodiments, e.g., without one or without all of the features of the method aspect and/or the device aspect.

In any aspect, the technique may be implemented using a timer that is set to expire after the predefined duration. The use of the timer may act as a "fail-safe" mechanism for the transmission of the skip signal. Examples for the "failure" may comprise an always-fulfilled criterion.

The technique may be implemented as a timer-based method of skip signal transmission. The downlink control channel may be a physical downlink control channel (PDCCH). The skip signal may be a PDCCH-skip signal. The technique may be implemented in a RAN1, a physical layer (PHY layer) or Layer-1, e.g., of the access node. The technique may be combined with a discontinuous reception (DRX) of the radio device. The technique may control (e.g., reduce) PDCCH monitoring and/or can achieve power savings at the radio node.

The access node and/or the radio device may form, or may be part of, a radio network, e.g., according to the Third Generation Partnership Project (3GPP) or according to the standard family IEEE 802.11 (Wi-Fi). The method aspect may be performed by one or more embodiments of the access node in the radio network. The radio network may be a radio access network (RAN). The RAN may comprise one or more access nodes, e.g. base stations, at least some being embodiments of the technique. The access node may serve one or more radio devices including the radio device referred to for the technique. The technique may be performed by the access node with respective to multiple radio devices.

Any of the radio devices may be a 3GPP user equipment (UE) or a Wi-Fi station (STA). The radio device may be a mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Any of the radio devices may be wirelessly connected or connectable (e.g., according to a radio resource control, RRC, state or active mode) with the access node.

The access node may encompass any station that is configured to provide radio access to any of the radio devices. The access node may be a base station, a transmission and reception point (TRP), a radio access node or an access point (AP). The access node may provide a data link to a host computer providing user data through the access node to the radio device.

Examples for the access node may include a 3G base station or Node B, 4G base station or eNodeB, a 5G base station or gNodeB, a Wi-Fi AP and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical Layer (PHY), a Medium Access Control (MAC) layer, a Radio Link Control (RLC) layer and/or a Radio Resource Control (RRC) layer of a protocol stack for the radio communication.

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively, or in addition, the method may be encoded in a Field-Programmable Gate Array (FPGA) and/or an Application-Specific Integrated Circuit (ASIC), or the functionality may be provided for download by means of a hardware description language.

As to a still further aspect a communication system including a host computer is provided. The host computer comprises a processing circuitry configured to provide user data. The host computer further comprises a communication interface configured to forward the user data to a cellular network (e.g., the RAN and/or the access node) for transmission to a UE. A processing circuitry of the cellular network is configured to execute any one of the steps of the method aspect.

The communication system may further include the UE. Alternatively, or in addition, the cellular network may further include one or more access nodes configured for radio communication with the UE and/or to provide a data link between the UE and the host computer using the method aspect.

The processing circuitry of the host computer may be configured to execute a host application, thereby providing the user data and/or any host computer functionality described herein. Alternatively, or in addition, the processing circuitry of the UE may be configured to execute a client application associated with the host application.

Any one of the devices, the UE, the access node, the communication system or any node or station for embodying the technique may further include any feature disclosed in the context of the method aspect, and vice versa. Particularly, any one of the units and modules disclosed herein may be configured to perform or initiate one or more of the steps of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented for any other radio communication technique, including a Wireless Local Area Network (WLAN) implementation according to the standard family IEEE 802.11, 3GPP LTE (e.g., LTE-Advanced or a related radio access technique such as Multe-Fire), Bluetooth according to the Bluetooth Special Interest Group (SIG), particularly Bluetooth Low Energy, Bluetooth Mesh Networking and Bluetooth broadcasting, Z-Wave according to the Z-Wave Alliance or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
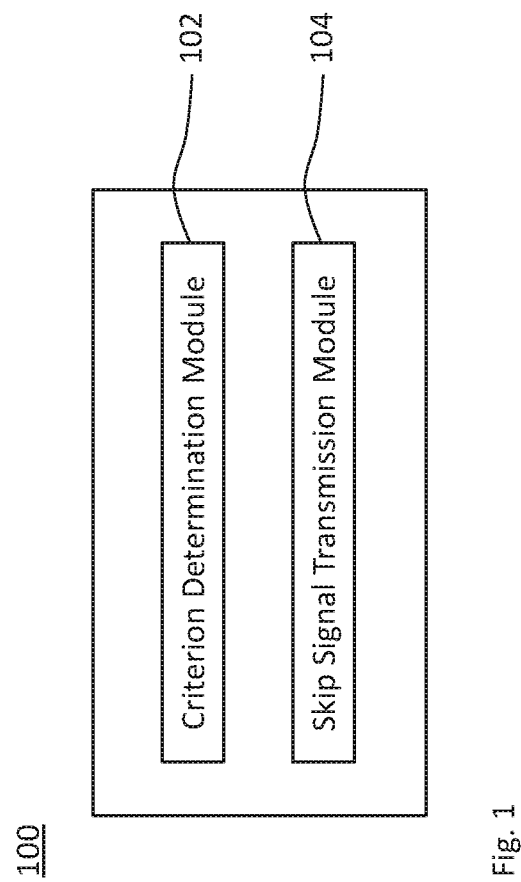
FIG. 1 shows a schematic block diagram for a first embodiment of a device for selectively transmitting a skip signal from an access node to a radio device.

FIG. 1 schematically illustrates a block diagram of an embodiment of a device for selectively transmitting a skip signal indicative of skipping a downlink control channel from an access node to a radio device. The device is generically referred to by reference sign 100.

The device 100 comprises a criterion determination module 102 (or briefly determination module 102) that determines, e.g., for the radio device, whether a criterion for skipping the downlink control channel and/or for transmitting the skip signal indicative of skipping the downlink control channel is fulfilled. The device 100 further comprises a skip signal transmission module 104 (or briefly transmission module 104) that transmits, e.g., to the radio device, the skip signal indicative of skipping the downlink control channel if the criterion has been determined to be fulfilled for a predefined duration.

Any of the modules of the device 100 may be implemented by units configured to provide the corresponding functionality.

The device 100 may also be referred to as, or may be embodied by, the access node. The access node 100 and the radio device may be in direct radio communication, e.g., at least for the transmission of the skip signal from the access node 100 to the radio device.

Figure 2:
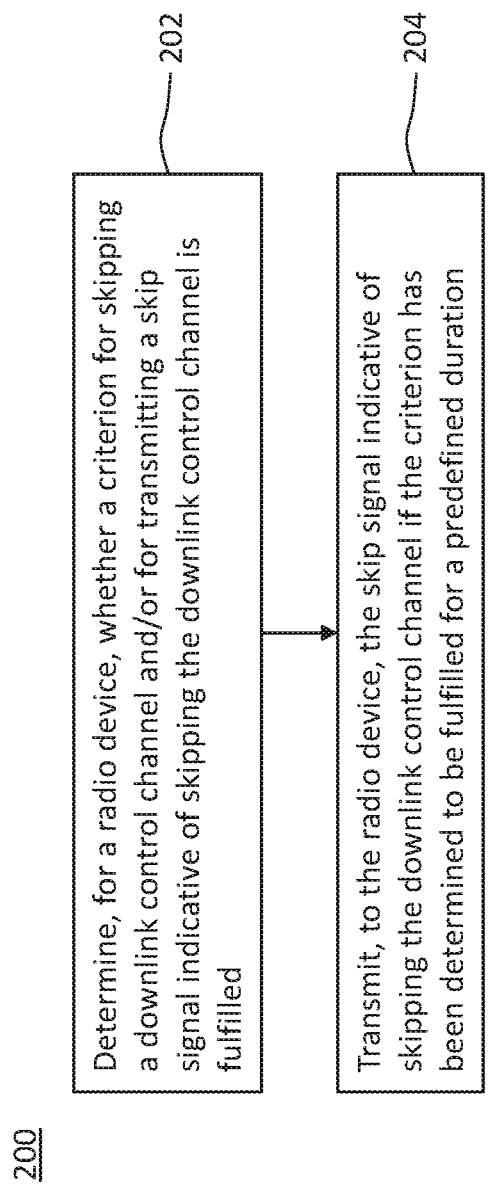
FIG. 2 shows a flowchart for a first embodiment of a method of selectively transmitting a skip signal, which method may be implementable by the device of FIG. 1.

FIG. 2 shows an example flowchart for a method 200 of selectively transmitting a skip signal indicative of skipping a downlink control channel from an access node 100 to a radio device. A step 202 determines, e.g., with regard to the radio device, whether a criterion for at least one of skipping the downlink control channel and transmitting the skip signal indicative of skipping the downlink control channel is fulfilled. A step 204 transmits, e.g., to the radio device, the skip signal indicative of skipping the downlink control channel if the criterion has been determined to be fulfilled for a predefined duration.

The criterion may have been determined to be fulfilled for a predefined duration if the step 202 performed multiples times within the predefined duration determines consistently that the criterion is fulfilled.

Skipping the downlink control channel may encompass skipping the monitoring of the downlink control channel at the radio device.

The method 200 may be performed by the device 100. For example, the modules 102 and 104 may perform the steps 202 and 204, respectively.

Herein, the device 100 for selectively transmitting a skip signal indicative of skipping a downlink control channel from an access node to a radio device may be the access node, e.g., a base station. Furthermore, any base station may be a station providing radio access, may be part of a radio access network (RAN) and/or may be a node connected to the RAN for controlling the radio access.

Herein, any radio device may be a mobile or portable station and/or any radio device wirelessly connectable to a base station or RAN. For example, the radio device may be a user equipment (UE), a device for machine-type communication (MTC) or a device for (e.g., narrowband) Internet of Things (IoT). Two or more radio devices may be configured to wirelessly connect to each other, e.g., in an ad hoc radio network or via a 3GPP SL connection.

The technique may be implemented at the access node (e.g., a gNB) or another node of the radio access network (RAN) that is serving the radio device or the core network (CN) supporting the access node.

The technique may be implemented, e.g., at the network side, preferably at the access node 100, using of a determination timer (or briefly: timer) and, optionally, a skip state (e.g., a skip state variable or briefly: state-variable).

Embodiments can control, limit and/or minimize a number of skip signal transmissions 204 (e.g., on and/or relating to a Physical Downlink Control Channel or PDCCH), e.g., which would be conventionally transmitted whenever the criterion for transmitting the skip signal is satisfied. The embodiments can limit the number of transmissions 204, e.g., when the criterion is fulfilled most of the time.

Figure 3:
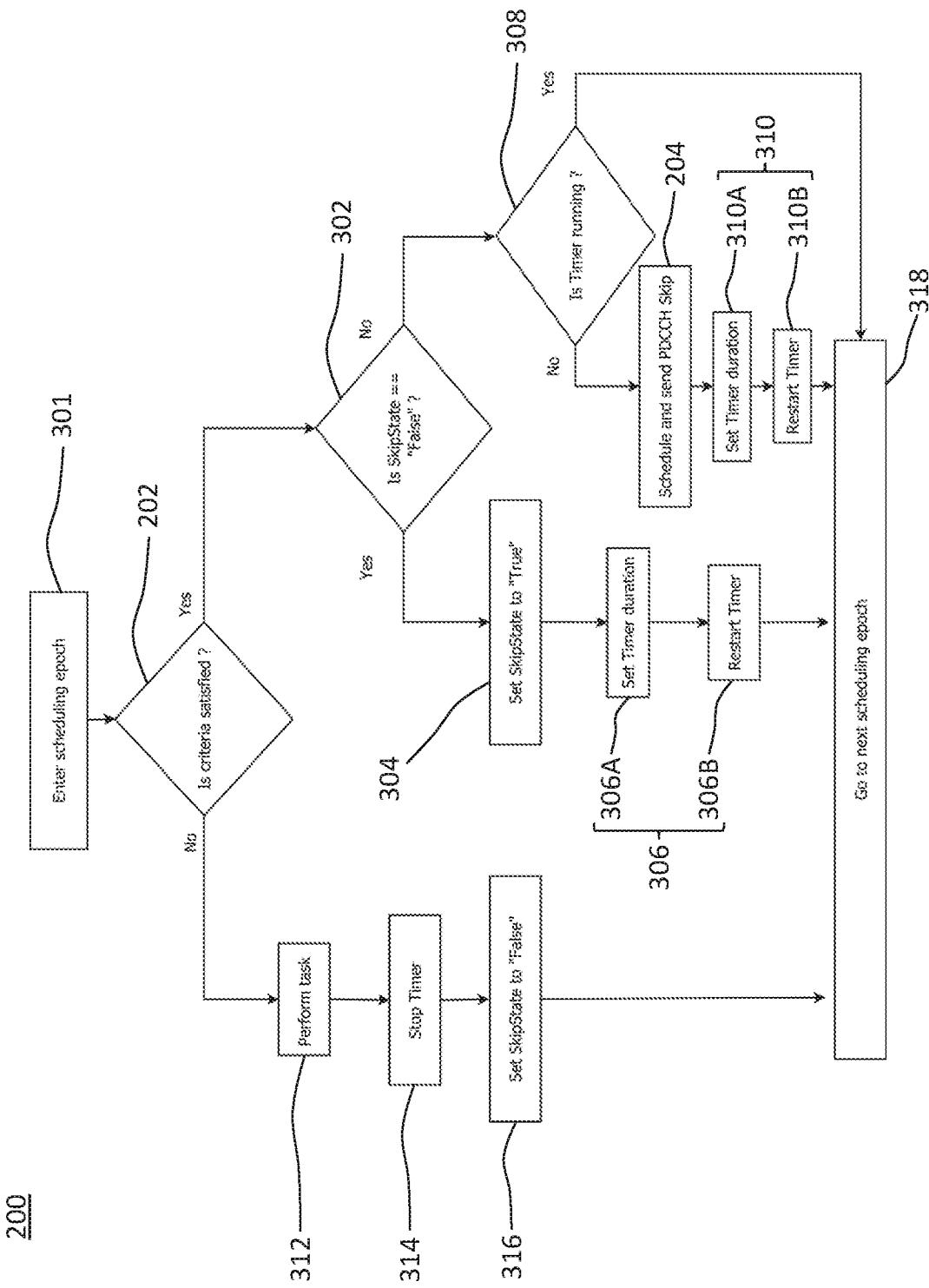
FIG. 3 shows a flowchart for a second embodiment of a method of selectively transmitting a skip signal, which method may be implementable by the device of FIG. 1.
Figure 4:
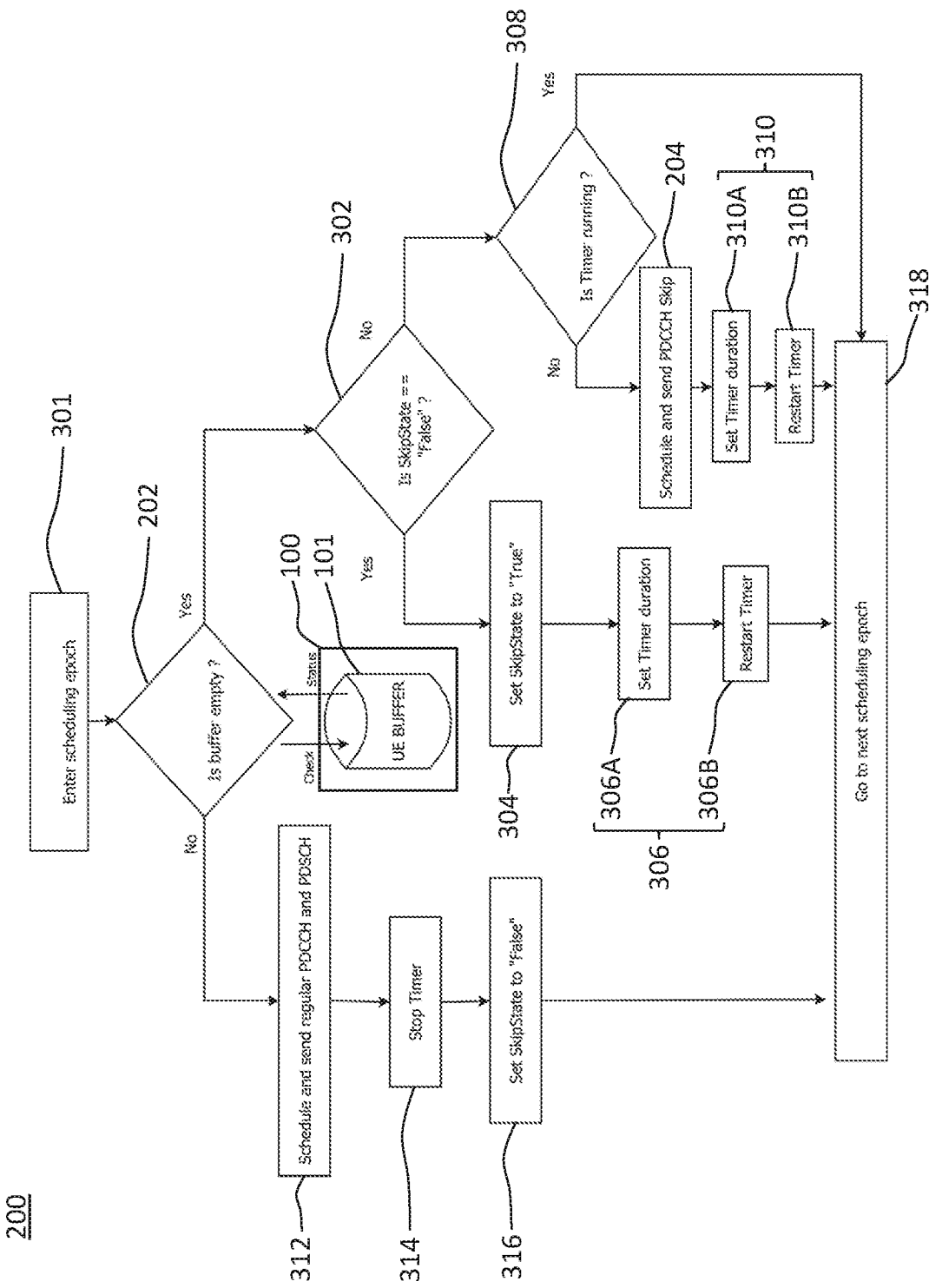
FIG. 4 shows a flowchart for a third embodiment of a method of selectively transmitting a skip signal, which method may be implementable by the device of FIG. 1.
Figure 5:
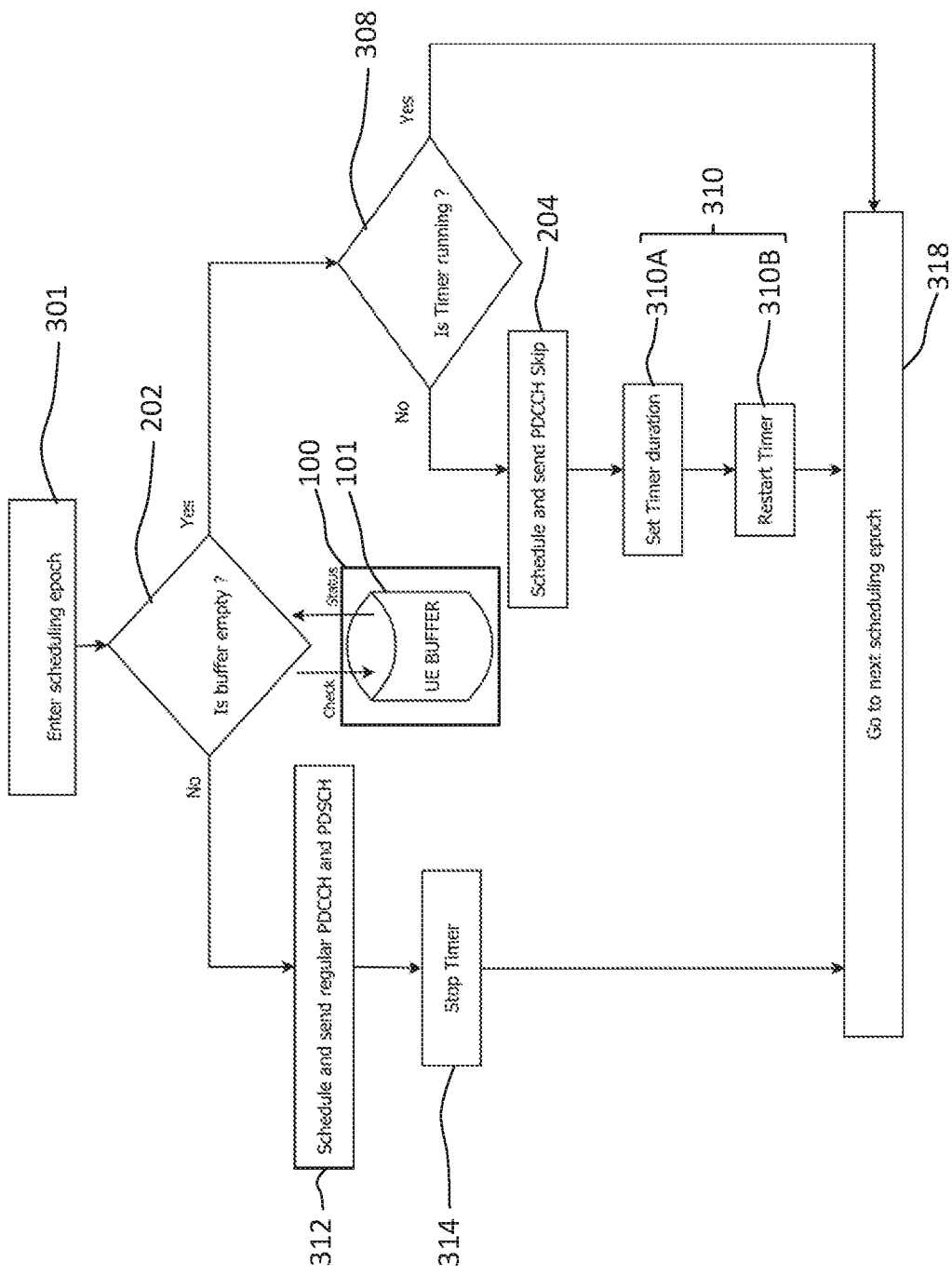
FIG. 5 shows a flowchart for a fourth embodiment of a method of selectively transmitting a skip signal, which method may be implementable by the device of FIG. 1.

Method embodiments of the technique are described, partially with reference to the FIGS. 3 to 5 for illustration and not limitation.

The method 200 may comprise, when the criterion is determined to be fulfilled (i.e., satisfied) in the step 202 and the determination timer is not running, starting the determination timer, e.g., as schematically illustrated in each of the FIGS. 3 to 5 at a step 306 and/or 310. The determination timer is run for a desired duration (i.e., the predefined duration), which is set at a sub-step 306A and/or 310A.

Alternatively or in addition, the method 200 may comprise, when the criterion is checked again according to the step 202 that the criterion is satisfied and if the determination timer has expired, transmitting (e.g., only then) the PDCCH-skip signal according to the step 204. The timer is then re-started according to the step 310.

A block diagram illustrating a second method embodiment is shown in FIG. 3. A variation of the second embodiment of FIG. 3 can be obtained by eliminating steps or branches in the flow chart of FIG. 3 relating to the state-variable SkipState. This amounts to removing the left branch of the branching point 302 wherein the access node 100 checks the variable SkipState. Such a variation might result in a suboptimal performance in terms of achievable throughput with less memory requirements.

Optionally, in any embodiment, the duration of determination timer (i.e., the predefined duration, which may be controlled by the RAN, preferably by the access node 100), is greater than a sleep time of the radio device (e.g., a UE).

The criterion for skipping the downlink control channel or for transmitting the skip signal may correspond to a conventional criterion, e.g., a criterion that would conventionally trigger the transmission of the skip signal. The technique may be implemented as an enhancement that uses the conventional criterion in the step 202 and selectively transmits the skip signal according to the step 204.

The cases of transmitting the skip signal according to the step 202 may be (e.g., strictly) reduced compared to a conventional skip signal transmission. The conventional criterion may be a necessary and sufficient criterion for a conventional skip signal transmission. For the transmission according to the step 204, the conventional criterion may be a necessary and not sufficient criterion.

The criterion may be fulfilled, if or whenever a downlink (DL) data buffer is empty (e.g., for the respective radio device) and/or if nothing is scheduled (e.g., for the respective radio device).

FIG. 4 shows a flowchart for a third embodiment of a method 200, which may be combined with the first and/or the second method embodiment.

An empty data buffer status of a buffer 101 for the radio device, e.g. a UE, (as the criterion in the step 202) and a timer status are used as a criterion to determine (e.g., in the step 202) when to transmit (e.g., in the step 204) the PDCCH-skip signal. Different timer lengths (predefined durations) may typically be used before the first skip signal (e.g., a PDCCH skip command) and between subsequent PDCCH skip commands as shown above. This is done by setting (e.g., in the sub-steps 306A and/or 310A) the timer duration to the desired value.

The third method embodiment is described with reference to the flow chart (shown as a decision tree) in FIG. 4.

An exemplary criterion for deciding when to send the PDCCH-skip signal in the sense of the criterion in the step 202 is based on the UE's data buffer-status, which the network (e.g., the access node 100) has knowledge of. This information related to the buffer is maintained at the networks side and is used for scheduling the UE. This information may not be known to the UE or not communicated to the UE. The empty buffer-status is conventionally used as a trigger for transmitting the PDCCH-skip signal. For a downlink transmission, this buffer can also be the downlink buffer that the network maintains. In this example, when the buffer is not empty, the access node 100 perform the task 312 of scheduling a regular PDCCH and Physical Downlink Shared Channel (PDSCH) transmission.

With the aid of FIG. 4 for illustration and not limitation, the method 200 may comprise at least one of the following steps.

In a step 301, the access node 100 enters a scheduling epoch. When the access node 100 enters a scheduling epoch, the network (e.g., access node 100) may seek to determine if the UE should be scheduled for data transmission and/or data reception.

In the step 202 of the method 200, in one variant, the network (e.g., the access node 100) makes a query on the buffer 101 to determine if the buffer is empty. In another variant, which may be combined with the one variant, the network (e.g., the access node 100) relies on a buffer status report (BSR) of the UE.

Depending upon the result, the access node 100 transitions either to the left branch of the branching point representing the step 202 or to the right branch of branching point 202.

If the buffer is non-empty (Left Branch), the network schedules 312 the UE for data transmission by first transmitting a regular PDCCH followed by a PDSCH transmission. The determination timer, if it is running, is stopped 314 and the state-variable SkipState is set 316 to False indicating that the current status of the buffer is non-empty and, thus, the access node 100 will not transmit a PDCCH-skip signal according to the step 204.

From here on, the flow of execution proceeds to the next scheduling epoch.

If the buffer is empty (Right Branch), the access node 100 performs a step 302. At this branching point 302, the status of the state-variable SkipState is checked and depending upon its state, the access node 100 transits to either the left branch or right branch of the branching point 302.

Left Branch: The access node 100 enters this branch whenever transitioning from a non-empty buffer state to an empty buffer state. Rather than immediately transmitting a PDCCH-skip signal, the access node sets 304 the state-variable SkipState to True, sets 306A the timer duration, e.g. to the desired or predefined value, and restarts 306B the duration timer. After the expiry of this timer, if the buffer 101 is still empty, only then the access node 100 transmits the PDCCH-skip signal according to the step 204.

This is done so to make the method 200 robust towards any immediately incoming data transmission. If the access node did transmit the PDCCH-skip signal when the access node transitions from a non-empty state to an empty state, then any immediate incoming data transmission cannot be scheduled as the UE would be asleep.

After setting 306A the timer duration and restarting 306B the timer, the execution flow moves to the next scheduling epoch.

Right Branch: The access node 100 enters this branch whenever the buffer state has not changed and is empty. At this branch, the access node 100 performs a step 308 of the method 200, i.e., at the branching point 308, the running status of the determination timer is checked. Depending upon the running status, the access node 100 transits to either the left branch or right branch of the branching point 308.

Left Branch: The access node 100 enters this branch whenever the buffer is empty, and the timer has expired. When this happens, the network then schedules a PDCCH-skip signal transmission 204 to indicate to the UE to skip monitoring the PDCCH for a specified period. The timer duration is then set 310A to a desired value and restarted 310B, and the execution flow moves to the next scheduling epoch.

Right Branch: The access node 100 transits to this branch when the buffer is empty, and the determination timer is still running. In this case, the network does not schedule any PDCCH-skip signal transmission if the timer is running. Any incoming data that arrives while the timer is running will be scheduled and there will be no latency in handling of such data transmissions. The execution flow proceeds to the next scheduling epoch.

FIG. 5 shows a flow chart for an exemplary implementation or fourth embodiment of the method 200 that makes use of a timer and empty data buffer status of the UE to determine when to send the PDCCH-skip signal. In this embodiment, no tracking of state changes from a non-empty buffer state to the empty state is done.

A variation of the third embodiment is described as a fourth embodiment with reference to FIG. 5. The fourth embodiment can be obtained by getting rid of the state-variable SkipState and only keeping the usage of a timer. This embodiment is shown in FIG. 5. The embodiment works like that of the third embodiment in FIG. 4 and is a variation. By getting rid of the state-variable SkipState, the embodiment in FIG. 5 does not keep track of the buffer state changes. The drawback with this might be that the embodiment is less robust to data that arrive quite close to each other.

An embodiment of the technique may comprise any of the below features alone or in combination with any other embodiment.

Alternatively or in addition to the examples or embodiments provided above, in one embodiment, the gNB (as a non-limiting example of the access node 100) takes additional criteria into account, e.g., in the criterion for the step 202, in order to decide to transmit the (e.g. PDCCH-) skip signal (e.g., a PDCCH skipping command). By way of example, the gNB 100 may refrain from transmitting a PDCCH skipping command if the gNB 100 expects immediate data arrival in the DL buffer for the respective UE, or the UE communicates in terms of assistance information about expected DL and/or UL traffic. Alternatively or in addition, the UE transmits a scheduling request (SR) and/or initiates a beam recovery procedure.

In another embodiment, the gNB 100 may refrain from transmitting PDCCH skipping command because of shortage of PDCCH resources. This feature may be implemented by changing the timer duration, e.g. to infinity or equal to the inactivity timer.

In another embodiment, the gNB 100 could set the timer adaptively according to the gNB 100 resources and/or the PDCCH/PDSCH transmission statistics. For example, the timer can be set to 10 ms for the first 20 ms after the last PDSCH transmission. The timer then can be extended to 20 ms, 20 ms after the last PDSCH transmission, and so on. Such a solution may be obtained by setting the timer duration to a desired value in any of the embodiments, e.g., those shown in FIGS. 2 to 5.

In one embodiment, one timer value T1 is used specifying delay before the first PDCCH skipping command, and another timer value T2 is used between subsequent PDCCH skipping commands. The T1 value may be dependent on traffic characteristics and an implementation of buffers in the gNB 100, minimizing the risk of packets arriving to the queue soon after the PDCCH skipping command is sent. The timer value T2 needs to be at least as long as the actual PDCCH skip length. Both T1 and T2 values can be adaptive, according to any previous embodiment.

In yet another embodiment, beside a regular timer (e.g. in millisecond, or slots), the timer can also be in terms of the slot number. For example, the timer is considered as expired when $mod(slot\_number, X) = Y$ where $Y < X$. In this option, the PDCCH skipping command is sent in a grid manner.

In any of the examples mentioned above, the gNB 100 may take these additional criteria to decide to restart or stop the timer. E.g., immediate expected traffic can lead to the gNB 100 restarting the timer. This feature may be implemented at the network by adaptively changing the timer duration, which may include restarting or stopping the timer.

Alternatively, the gNB 100 may overrule the timer-based approach, if an additional criterion is satisfied. E.g., if the UE is in critical power status, the gNB 100 may transmit a PDCCH skipping command, even if the timer is still running. Or it may transmit the PDCCH skipping command, if the UE is not going to be scheduled for a time larger than the remaining time of the timer.

In another embodiment, the gNB as a non-limiting example of the access node 100 may employ the (e.g., PDCCH-) skip signal (e.g., a PDCCH skipping command) as a monitoring adaptation tool. For example, the gNB 100 does not expect immediate data in an activated Secondary Cell (Scell), however, the gNB 100 is not sure enough to deactivate the Scell, or deactivation takes longer (e.g., longer than the time which is needed for the UE to stop monitoring the PDCCH following the skip signal). The gNB 100 may then decide to transmit the PDCCH skipping command either to reduce the additional power consumption due to the non-utilized activated Scell, or to adapt the PDCCH monitoring periodicity in the Scell. The same or a similar embodiment can be implemented in a Primary Cell (Pcell), for example, if the gNB 100 wants the UE to not monitor every other monitoring occasion of the downlink control channel (e.g., not every PDCCH MO, e.g. not every PDCCH monitoring occasion), or every second, or any other pattern. The gNB 100 may transmit a PDCCH skipping command with a specified duration to adapt the PDCCH monitoring occasions.

The technique may be implemented in the context of power saving features. A first type of power saving features is applied during an active time of the UE. The goal here is to design features that allow power savings for the UE device when operating during active time. Active time can be loosely defined as whenever the UE is awake and there is ongoing traffic activity. During this time, the UE is transmitting/receiving data, performing measurements and monitoring a control channel (e.g., a Physical Downlink Control Channel or PDCCH) for any potential upcoming data transmissions/receptions. Broadly, the main reason for wasted energy consumption is the use of L1 features when there is no traffic activity. The use of these features results in high power consumption especially when there is no traffic activity.

Some of the power saving features, for active time, which may be combined or enhanced according to the technique, include at least one of cross-slot scheduling; adaptation of antennas; adaption of bandwidth parts; adaptation of an Secondary Cell (Scell-Adaptation); and PDCCH monitoring reduction or PDCCH adaptation.

Alternatively or in addition, the technique may be implemented in the context of power saving features during DRX. The goal here is to design features that allow power savings when the UE is in Discontinuous Reception (DRX). The UE moves to a DRX state when there is no traffic activity for a certain period. This period where there is no traffic activity is known as the inactivity time. When in the DRX state, the UE periodically switches between a sleep-state and an awake-state (or commonly known as On-duration) of fixed duty-cycle which is typically RRC configured. During the On-duration of the DRX cycle, the UE monitors the PDCCH for any potential data transmission/reception, and after its expiry the UE goes to the sleep-state. The main source of wasted energy consumption occurs when there is no traffic during the DRX which results in unnecessary monitoring during the awake-state or On-duration of the DRX cycle.

To address this issue, a power saving signal, e.g. a PDCCH-skip signal, sent by the network, is used to indicate to the UE to either skip monitoring the upcoming On-duration or to resume monitoring the On-duration. For example, the UE wakes-up in the upcoming On-duration if and only if it has successfully received a power-saving signal. If no such signal is detected, then it continues to be in a sleep-state.

The technique may be realized by enhancing an existing technique of transmitting a PDCCH-skip signal for PDCCH reduction and/or monitoring.

The technique is applicable to achieving power savings for a UE device during active time. Specifically, the focus is on using the PDCCH-skip signal for PDCCH monitoring adaptation/reduction which is expected to enable large power saving gains for UE devices. PDCCH monitoring reduction/adaptation is one of the features currently being discussed in the RAN1 work item on UE power savings for NR. Currently, a Rel-15 UE device can be RRC configured with a desired PDCCH monitoring periodicity. Because this is RRC configured, dynamic adaptation of the periodicity to traffic is not possible. High wastage of energy results when the UE monitors for the PDCCH but there is little or no data to be transmitted/received.

There are many ways for performing PDCCH monitoring reduction/adaptation with a PDCCH-skip signal being one among them. During active time, the network transmits a PDCCH-skip signal to the UE. Upon successful reception and decoding of the PDCCH-skip signal, the UE goes to sleep for a specified duration of time. This sleep duration can be an RRC configured value or it can be indicated in the DCI of the PDCCH-skip signal. Upon completion of the sleep-duration, the UE wakes-up and resumes monitoring of the PDCCH.

Because the PDCCH-skip signal is an L1-based signal, the UE can be made to dynamically adapt its monitoring of the PDCCH which can result in power savings for the UE. As can be inferred, the criterion for choosing when to transmit the PDCCH-skip signal may be completely up to the network and/or may be a proprietary feature.

Figure 6:
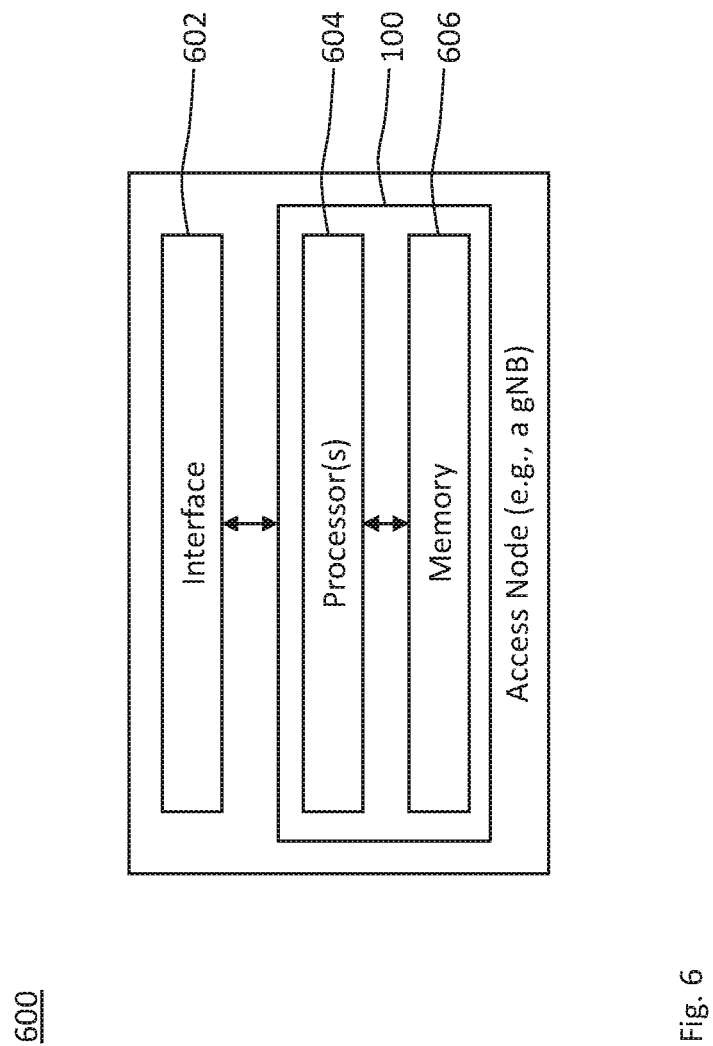
FIG. 6 shows a schematic block diagram of an access node embodying the device of FIG. 1.

FIG. 6 shows a schematic block diagram for an embodiment of the device 100. The device 100 comprises one or more processors 604 for performing the method 200 and memory 606 coupled to the processors 604. For example, the memory 606 may be encoded with instructions that implement at least one of the modules 102 and 104.

The one or more processors 604 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 606, base station functionality. For example, the one or more processors 604 may execute instructions stored in the memory 606. Such functionality may include providing various features and steps discussed herein, including any of the benefits disclosed herein. The expression "the device being operative to perform an action" may denote the device 100 being configured to perform the action.

As schematically illustrated in FIG. 6, the device 100 may be embodied by an access node 600, e.g., functioning as a serving base station for the UE. The access node 600 comprises a radio interface 602 coupled to the device 100 for radio communication with one or more UEs.

Figure 7:
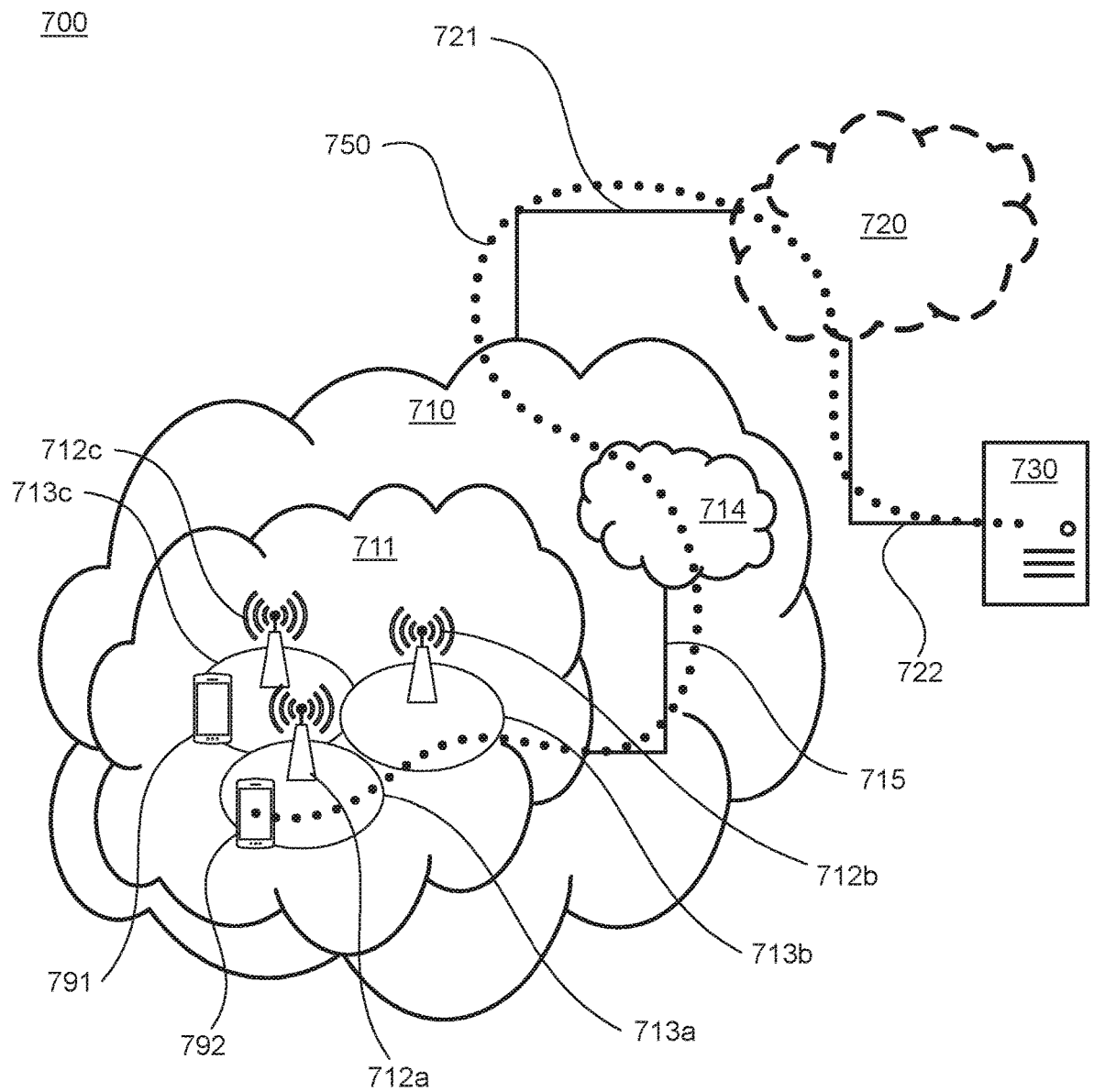
FIG. 7 schematically illustrates an example telecommunication network, optionally connected via an intermediate network to a host computer.

With reference to FIG. 7, in accordance with an embodiment, a communication system 700 includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first UE 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

Any of the base stations 712 may embody the device 100.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. The connections 721, 722 between the telecommunication network 710 and the host computer 730 may extend directly from the core network 714 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system 700 of FIG. 7 as a whole enables connectivity between one of the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 712 need not be informed about the past routing of an incoming downlink communication with data originating from a host computer 730 to be forwarded (e.g., handed over) to a connected UE 791. Similarly, the base station 712 need not be aware of the future routing of an outgoing uplink communication originating from the UE 791 towards the host computer 730.

By virtue of the method 200 being performed by any one of the base stations 712, the performance of the OTT connection 750 can be improved, e.g., in terms of increased throughput and/or reduced latency.

Example implementations, in accordance with an embodiment of the UE, base station and host computer discussed in the preceding paragraphs, will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data, which is transmitted using the OTT connection 850. The user data may depend on the location of the UE 830. The user data may comprise auxiliary information or precision advertisements (also: ads) delivered to the UE 830. The location may be reported by the UE 830 to the host computer, e.g., using the OTT connection 850, and/or by the base station 820, e.g., using a connection 860.

The communication system 800 further includes a base station 820 comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with a UE 830 located in a coverage area (not shown in FIG. 8) served by the base station 820. The communication interface 826 may be configured to facilitate a connection 860 to the host computer 810. The connection 860 may be direct, or it may pass through a core network (not shown in FIG. 8) of the telecommunication system 800 and/or through one or more intermediate networks outside the telecommunication system 800. In the embodiment shown, the hardware 825 of the base station 820 further includes processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station 820 serving a coverage area in which the UE 830 is currently located. The hardware 835 of the UE 830 further includes processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
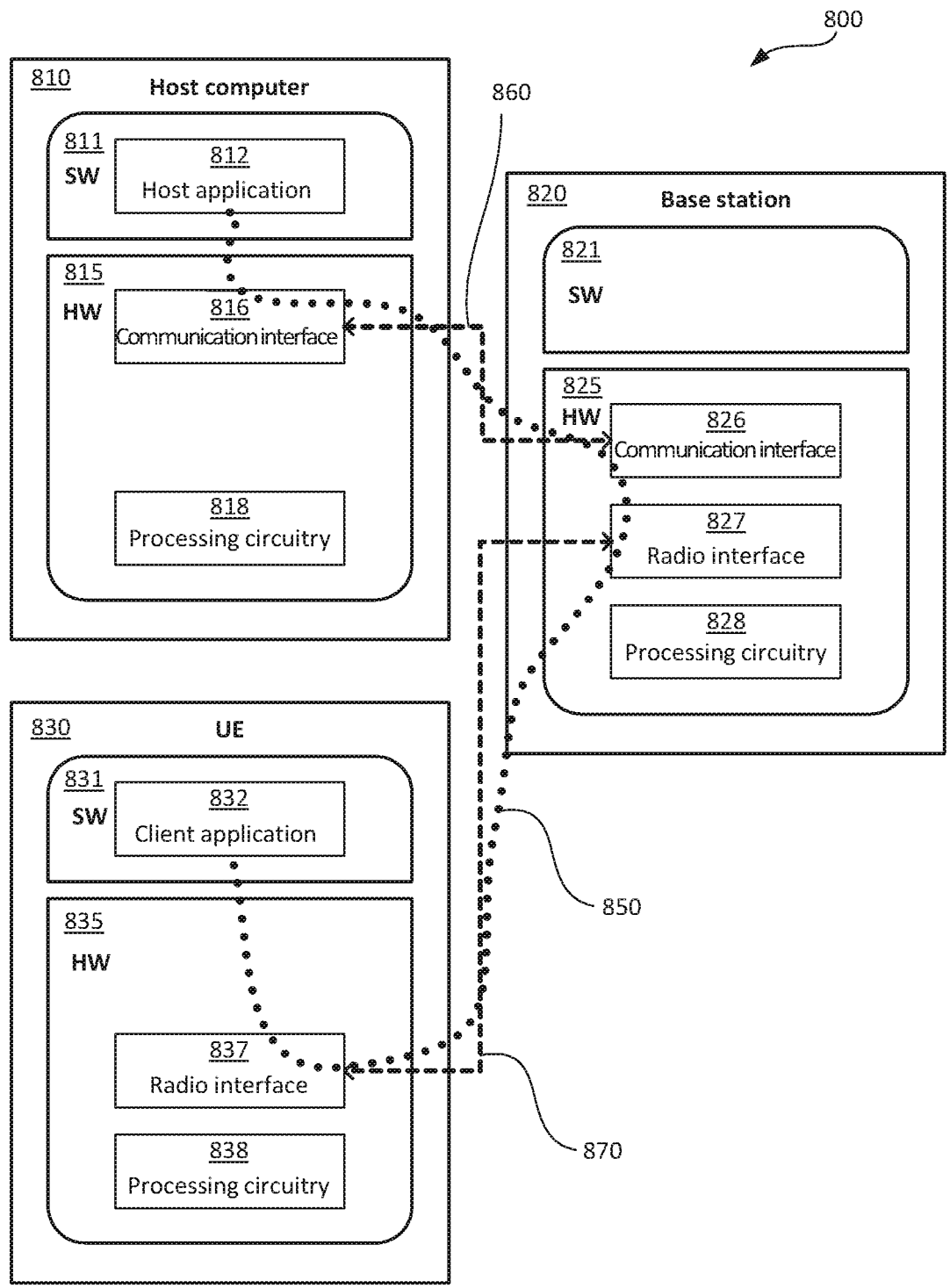
FIG. 8 shows a generalized block diagram of a host computer communicating via a base station as the access node with a user equipment as the radio device over a partially wireless connection.

It is noted that the host computer 810, base station 820 and UE 830 illustrated in FIG. 8 may be identical to the host computer 730, one of the base stations 712a, 712b, 712c and one of the UEs 791, 792 of FIG. 7, respectively. This is to say, the inner workings of these entities may be as shown in FIG. 8, and, independently, the surrounding network topology may be that of FIG. 7.

In FIG. 8, the OTT connection 850 has been drawn abstractly to illustrate the communication between the host computer 810 and the UE 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may reduce the latency and improve the data rate and thereby provide benefits such as better responsiveness and improved QoS.

A measurement procedure may be provided for the purpose of monitoring data rate, latency, QoS and other factors on which the one or more embodiments improve. There may further be an optional network functionality for reconfiguring the OTT connection 850 between the host computer 810 and UE 830, in response to variations in the measurement results. The measurement procedure and/or the network functionality for reconfiguring the OTT connection 850 may be implemented in the software 811 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 811, 821, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency and the like. The measurements may be implemented in that the software 811, 831 causes messages to be transmitted, in particular empty or "dummy" messages, using the OTT connection 850 while it monitors propagation times, errors etc.

Figures 9, 10:
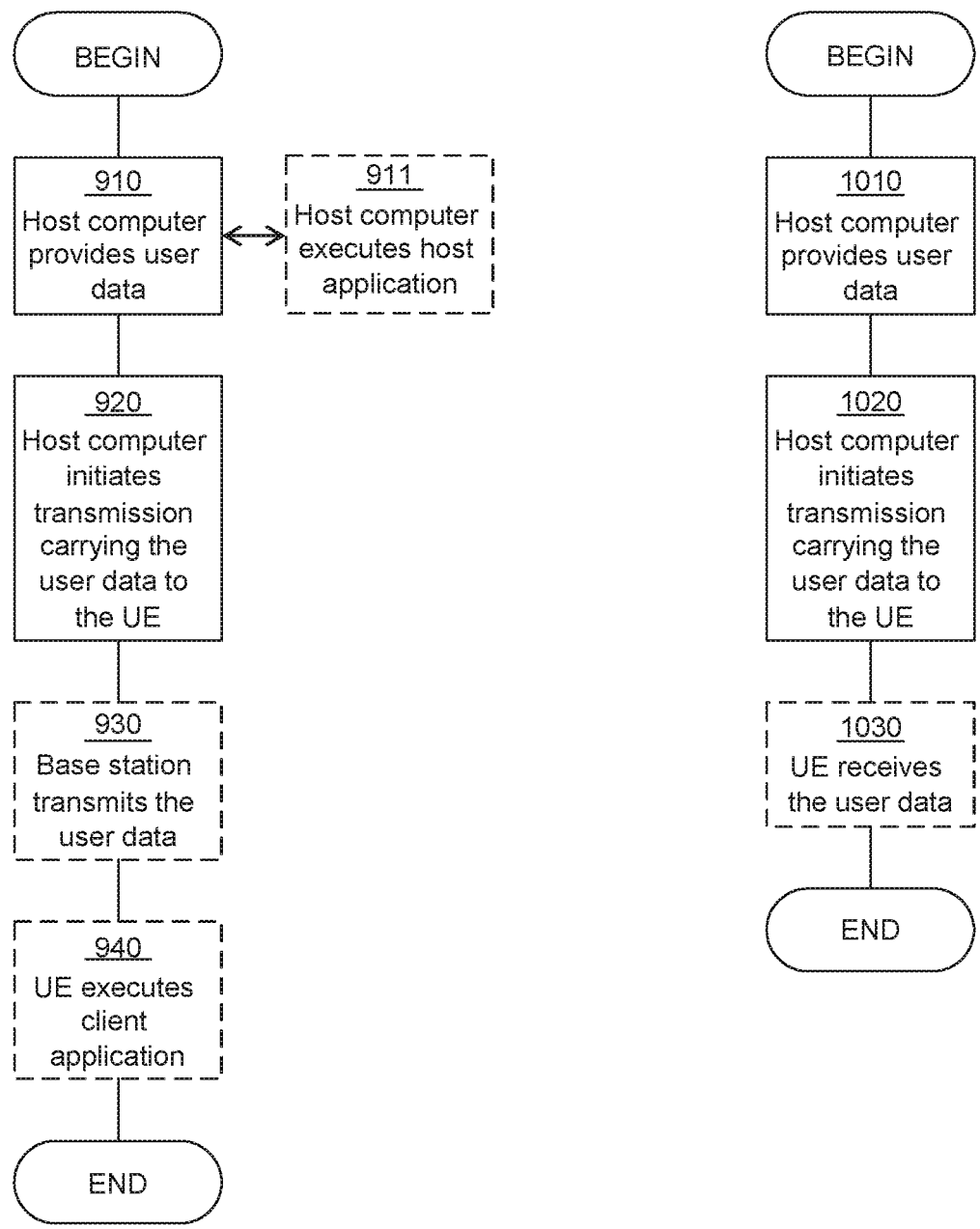
FIGS. 9 and 10 show flowcharts for methods implemented in a communication system including a host computer, a base station and a user equipment.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this paragraph. In a first step 910 of the method, the host computer provides user data. In an optional substep 911 of the first step 910, the host computer provides the user data by executing a host application. In a second step 920, the host computer initiates a transmission carrying the user data to the UE. In an optional third step 930, the base station transmits to the UE the user data which was carried in the transmission that the host computer initiated, in accordance with the teachings of the embodiments described throughout this disclosure. In an optional fourth step 940, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this paragraph. In a first step 1010 of the method, the host computer provides user data. In an optional substep (not shown) the host computer provides the user data by executing a host application. In a second step 1020, the host computer initiates a transmission carrying the user data to the UE. The transmission may pass via the base station, in accordance with the teachings of the embodiments described throughout this disclosure. In an optional third step 1030, the UE receives the user data carried in the transmission.

Any embodiment may use a timer that prevents unnecessary transmissions of a skip signal (e.g., a PDCCH-skip signal) when the one or more criteria for determining when to transmit the skip signal are satisfied frequently. Furthermore, by combining the use of the timer with keeping track of state changes between when the criterion is fulfilled and when the criterion is not fulfilled, embodiments can be robust to data transmissions that occur very close (e.g., in time) to each other. Embodiments can be implemented as a robust method for efficient transmission of the skip signal (e.g., the PDCCH-skip signal) without compromising on network resources.

As has become apparent from above description, embodiments of the technique can provide flexibility to the RAN or the access node, e.g., by changing the duration of the determination timer.

Same or further embodiments can be easily implemented, e.g., by using an existing skip signal transmission criterion as the criterion in the technique. Alternatively or in addition, the technique may be implemented using only two states (e.g., the set skip state and the released skip state) and maintaining a timer at the network side (e.g., at the access node). Such an implementation may be transparent to the radio device (e.g., the UE).

Same or further embodiments can enable the network to dynamically change a duration of the timer, e.g., as described for or illustrated in FIGS. 3 to 5.

Same or further embodiments can facilitates usage of simple criteria such as buffer status without dwelling into complex and/or highly computational prediction algorithms.

Implementations of the method may be robust to any traffic type and/or may minimize an impact on throughput loss, latency and/or network resources.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the technique may be defined or implemented within the scope of and/or according to any one the claims.

The invention claimed is:

1. A method of selectively transmitting a skip signal indicative of skipping a downlink control channel from an access node to a radio device, the method comprising:
    determining, for the radio device, whether a criterion for skipping the downlink control channel and/or transmitting the skip signal indicative of skipping the downlink control channel is fulfilled; and
    transmitting, to the radio device, the skip signal indicative of skipping the downlink control channel if the criterion has been determined to be fulfilled for a predefined duration, wherein the skip signal is transmitted if the criterion has been determined to be fulfilled at least twice within the predefined duration.

2. The method of claim 1, wherein the determining is repeated and/or performed periodically.

3. The method of claim 1, wherein the determining is performed multiple times prior to transmitting the skip signal to the radio device.

4. The method of claim 1, wherein the skip signal is transmitted if the criterion has been determined to be fulfilled at two or more different points in time.

5. The method of claim 1, further comprising, if the criterion is determined to be fulfilled and a determination timer for the radio device is not running, starting or restarting the determination timer, wherein the determination timer is set to expire after the predefined duration.

6. The method of claim 5, wherein the access node refrains from transmitting the skip signal until the criterion is still fulfilled after the expiry of the determination timer.

7. The method of claim 1, further comprising setting, if the criterion is determined to be fulfilled and a skip state is released for the radio device, the skip state for the radio device.

8. The method of claim 1, wherein the skip signal is transmitted in downlink control information on the downlink control channel.

9. The method of claim 1, wherein the skip signal triggers the radio device to refrain from monitoring the downlink control channel responsive to the skip signal during a skipping period.

10. The method of claim 1, further comprising transmitting a radio resource control (RRC) signal that is indicative of the skipping period during which the radio device refrains from monitoring the downlink control channel responsive to the skip signal.

11. The method of claim 1:
wherein the radio device is configured with a monitoring periodicity for monitoring the downlink control channel; and
wherein the skip signal is transmitted on the downlink control channel when the radio device monitors the downlink control channel according to the monitoring periodicity.

12. The method of claim 11, wherein the skip signal triggers the radio device to refrain from monitoring the downlink control channel according to the monitoring periodicity responsive to the skip signal.

13. The method of claim 1, wherein the criterion comprises a status of a buffer at the access node for the radio device and/or a status of a scheduling for the radio device.

14. A device for selectively transmitting a skip signal indicative of skipping a downlink control channel from an access node to a radio device, the device comprising:
processing circuitry;
memory containing instructions executable by the processing circuitry whereby the device is operative to:
determine, for the radio device, whether a criterion for at least one of skipping the downlink control channel and transmitting the skip signal indicative of skipping the downlink control channel is fulfilled; and
transmit, to the radio device, the skip signal indicative of skipping the downlink control channel if the criterion has been determined to be fulfilled for a predefined duration, wherein the skip signal is transmitted if the criterion has been determined to be fulfilled at least twice within the predefined duration.

15. The device of claim 14, wherein the skip signal is transmitted if the criterion has been determined to be fulfilled at two or more different points in time.

16. The device of claim 14, wherein the memory comprises instructions executable by the processing circuitry whereby the device is operative to, if the criterion is determined to be fulfilled and a determination timer for the radio device is not running, start or restart the determination timer, wherein the determination timer is set to expire after the predefined duration.

17. The device of claim 14, wherein the memory comprises instructions executable by the processing circuitry whereby the device is operative to, set, if the criterion is determined to be fulfilled and a skip state is released for the radio device, the skip state for the radio device.

18. A communication system including a host computer, comprising:
processing circuitry configured to provide user data; and
a communication interface configured to forward user data to a cellular network for transmission to a user equipment (UE);
wherein processing circuitry of the cellular network is configured to selectively transmitting a skip signal indicative of skipping a downlink control channel from an access node to a radio device by:
determining, for the radio device, whether a criterion for at least one of skipping the downlink control channel and transmitting the skip signal indicative of skipping the downlink control channel is fulfilled; and
transmitting, to the radio device, the skip signal indicative of skipping the downlink control channel if the criterion has been determined to be fulfilled for a predefined duration, wherein the skip signal is transmitted if the criterion has been determined to be fulfilled at least twice within the predefined duration.

19. The device of claim 14, wherein the processing circuitry of the cellular network is configured to set, if the criterion is determined to be fulfilled and a skip state is released for the radio device, the skip state for the radio device.

20. The communication system of claim 18, wherein the processing circuitry of the cellular network is configured to, if the criterion is determined to be fulfilled and a determination timer for the radio device is not running, start or restart the determination timer, wherein the determination timer is set to expire after the predefined duration.

* * * * *